US009534100B2

(12) United States Patent
Kisin et al.

(10) Patent No.: US 9,534,100 B2
(45) Date of Patent: Jan. 3, 2017

(54) ONE COMPONENT SPRAY POLYURETHANE APPLICATION

(71) Applicant: DOW GLOBAL TECHNOLOGIES LLC, Midland, MI (US)

(72) Inventors: Srdjan Kisin, Horgen (CH); Ludovic Harelle, Vendenheim (FR)

(73) Assignee: Doe Global Technologies LLC, Midland, MI (US)

( * ) Notice: Subject to any disclaimer, the term of this patent is extended or adjusted under 35 U.S.C. 154(b) by 7 days.

(21) Appl. No.: 14/415,359

(22) PCT Filed: Aug. 13, 2013

(86) PCT No.: PCT/US2013/054610
§ 371 (c)(1),
(2) Date: Jan. 16, 2015

(87) PCT Pub. No.: WO2014/035656
PCT Pub. Date: Mar. 6, 2014

(65) Prior Publication Data
US 2015/0191577 A1   Jul. 9, 2015

Related U.S. Application Data

(60) Provisional application No. 61/693,793, filed on Aug. 28, 2012.

(51) Int. Cl.
*C08J 9/14* (2006.01)
*C08J 9/12* (2006.01)
(Continued)

(52) U.S. Cl.
CPC ............. *C08J 9/146* (2013.01); *C08J 9/122* (2013.01); *C08J 9/127* (2013.01); *E04D 5/148* (2013.01);
(Continued)

(58) Field of Classification Search
CPC .... B29B 7/7409; B29B 7/7414; B29B 7/7419; B29B 7/7423; B29B 7/7428; B05B 7/0018–7/0068; B05B 7/262–7/267; B05B 11/06–11/068
See application file for complete search history.

(56) References Cited

U.S. PATENT DOCUMENTS 3,784,110 A   1/1974 Brooks
4,925,107 A   5/1990 Brown
(Continued)

FOREIGN PATENT DOCUMENTS

EP           0255060 A2 *  2/1988 ........... B05B 9/0894
WO    WO 2011123248 A1 * 10/2011

OTHER PUBLICATIONS

Machine Translation of EP0255060 A2. Feb. 3, 1988.*
(Continued)

*Primary Examiner* — Robert C Boyle
*Assistant Examiner* — Stephen Rieth
(74) *Attorney, Agent, or Firm* — Steven W. Mork

(57) ABSTRACT

Apply a one component spray polyurethane foam formulation through a dispensing accessory that has a removable nozzle by independently feeding the one component spray polyurethane foam formulation and a supplementary propellant into the dispensing accessory so that they combine in the removable nozzle and are expelled from the removable nozzle at a flow rate that is greater than 40 grams of foam formulation per 15 seconds.

7 Claims, 1 Drawing Sheet

(51) Int. Cl.
- *E04D 5/14* (2006.01)
- *B29B 7/74* (2006.01)
- *B29B 7/76* (2006.01)

(52) U.S. Cl.
CPC .............. *B29B 7/7438* (2013.01); *B29B 7/761* (2013.01); *B29B 7/7605* (2013.01); *C08J 2203/06* (2013.01); *C08J 2203/142* (2013.01); *C08J 2203/162* (2013.01); *C08J 2203/182* (2013.01); *C08J 2207/04* (2013.01); *C08J 2375/04* (2013.01); *C08J 2375/08* (2013.01)

(56) References Cited

U.S. PATENT DOCUMENTS

| | | |
|---|---|---|
| 4,996,812 A | 3/1991 | Venable |
| 5,129,581 A | 7/1992 | Braun et al. |
| 5,462,204 A | 10/1995 | Finn |
| 5,480,589 A * | 1/1996 | Belser ............... B01F 5/0619 261/76 |
| 5,494,228 A | 2/1996 | Eaton et al. |
| 5,529,245 A | 6/1996 | Brown |
| 6,021,961 A | 2/2000 | Brown |
| 6,054,499 A * | 4/2000 | Pauls ............... C08G 18/10 222/129 |
| 6,345,776 B1 * | 2/2002 | Hurray ............... B29B 7/7438 222/137 |
| 6,991,185 B2 | 1/2006 | Brown |
| 2007/0100010 A1 * | 5/2007 | Creazzo ............... C08J 9/144 521/98 |
| 2010/0069517 A1 * | 3/2010 | Swab ............... B29C 44/367 521/95 |
| 2012/0070620 A1 * | 3/2012 | Comert ............... C09J 7/0289 428/156 |

OTHER PUBLICATIONS

Isocyanates: Isonate and Voranate for adhesives, coatings, elastomers and sealants. Dow Chemical Company. Mar. 2000.*
Insta Stik Roofing STD Technical Data Sheet No. 291-92025-0512 (May 12, 2012).

* cited by examiner

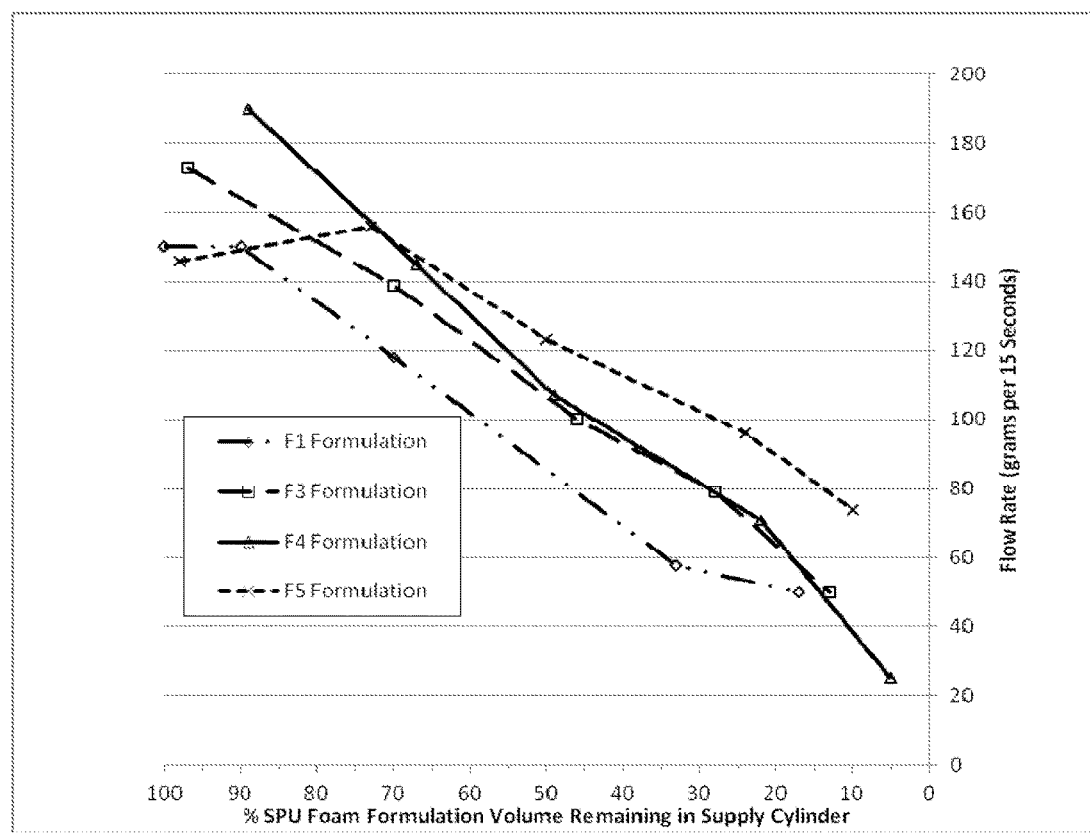

ONE COMPONENT SPRAY POLYURETHANE APPLICATION

BACKGROUND OF THE INVENTION

Field of the Invention

The present invention relates to a process for spraying one component polyurethane onto a substrate in a manner that is particularly useful for applying adhesives for flexible roof membranes.

Introduction

Spray polyurethane (SPU) foam is available from either one-component (1C) or two-component (2C) SPU foam formulations. Both 1C and 2C SPU formulations are typically available in pressurized vessels and are self-propelled through an applicator when dispensed onto a substrate.

A 1C formulation consists as a single mixture that includes a blowing agent and all reactants except moisture. Prior to use, 1C formulations are maintained under pressure to prevent escape of the blowing agent. 1C SPU formulations typically come in pressurized containers (for example, aerosol-type cans or cylinders) that are pressurized with a blowing agent, which also serves as a propellant that expels the 1C formulation from the pressurized container. To apply a 1C SPU formulation the pressurized container is attached to a nozzle, applicator gun or other dispensing accessory that allows triggered opening of the pressurized container. Upon opening of the pressurized container the 1C SPU foam formulation is self-propelled from the can by the blowing agent through the dispensing accessory. Upon release from the can, the blowing agent also froths the formulation into foam while reactants in the formulation react with atmospheric moisture to cure into a polymeric material. 1C SPU foam formulations provide a particular challenge due to their reactivity with atmospheric moisture. For instance, applicators used to dispense 1C SPU foam formulations tend to plug after use when moisture in the air cures residual 1C SPU foam formulation in the applicator accessory. Therefore, applicators (that is, dispensing accessories) must either be disposed of after use or promptly and extensively cleaned to remove 1C SPU foam formulation so that it does not cure in the applicator.

2C SPU foam formulations consist of two mixtures that are maintained apart until application of the SPU. The two mixtures are typically maintained under pressure with at least one of them containing a blowing agent and both containing a component that acts as a propellant. Upon application of a 2C SPU foam formulation, the pressurized mixtures are self-propelled through an applicator accessory (typically a gun-type applicator) where they are blended together just prior to exiting the applicator. Upon blending together, the two mixtures begin to react to form polymer as the blowing agent froths the reactants. As with the 1C SPU formulations, the applicator used to spray a 2C SPU foam formulation is typically disposed of after use or it must be promptly and thoroughly cleaned to prevent curing of the SPU foam formulation within the applicator. If not promptly and thoroughly cleaned the applicator becomes plugged and non-functional.

One application for SPU foam formulations is as an adhesive for flexible roofing membranes. Flexible roofing membranes are commonly applied over a substrate such as foam insulation board as a barrier material on flat or low-slope roofs. SPU foam formulations are a common adhesive used to adhere a flexible roofing membrane to a substrate in such an application. For example, 1C SPU foam formulations are commonly applied as beads in a pattern on a substrate and then a flexible roofing membrane is applied over the substrates and SPU foam formulation (see, for example, U.S. Pat. No. 5,494,228 and the INSTA STIK™ Roofing STD Technical Data Sheet number 291-92025-0512; INSTA STIK is a trademark of The Dow Chemical Company). The SPU foam formulation beads adhere the roofing membrane to the substrate. However the pattern of SPU foam formulation beads tends to be apparent as ridges in the roofing membrane and some find that undesirable. It is also possible for flexible roofing membranes to bubble or blister between beads of SPU foam adhesive, particularly as temperatures change. The resulting expansion and contraction of the roofing membrane between adhesive beads can serve to undesirably work the membrane free from adhesive beads over time. Therefore, it is desirable to find a way to economically dispense SPU foam formulation over an entire substrate so that there is no longer a bead pattern to impart into the roofing membrane and the entire roofing membrane would be adhered to a substrate.

U.S. Pat. No. 4,996,812 ('812) discloses a method of membrane application in roof construction that includes spraying a layer of adhesive onto a roof substrate and setting a roofing membrane over the adhesive layer. The adhesive layer in '812 can be a 2C SPU foam formulation or a 1C SPU foam formulation. '812 teaching requires an adhesive layer thickness that corresponds to one pound of adhesive per 8 to 12 square feet of substrate surface (408-613 grams per square meter of substrate surface). This is a relatively thick coating of adhesive. Thinner adhesive coatings are more desirable for a number of reasons including less cost and more efficient use of adhesive. Thinner coatings are particularly desirable for 1C SPU foam formulations, which require atmospheric moisture to cure. Moisture takes more time to penetrate into a thick coating so thick 1C SPU foam formulation layers take more time to fully cure than thin 1C SPU foam formulation layers. Longer cure times can result in less homogeneity in the adhesive layer, which can correspond to weaker adhesion. Thinner SPU foam formulation layers can also cure more quickly in low humidity environments because less moisture is needed to penetrate into the coating.

It is desirable to discover a way to apply a thin (less than 400 grams per square meter) layer of a 1C SPU foam formulation on a substrate for use as an adhesive layer for a flexible roofing membrane. It is further desirable to discover a way to apply such a layer of 1C SPU foam formulation in a manner that does not require either prompt and thorough cleaning of the applicator or disposal of the applicator.

BRIEF SUMMARY OF THE INVENTION

The present invention provides a solution to the problem of achieving a thin (less than 400 grams per square meter) layer of a one-component (1C) spray polyurethane (SPU) foam formulation onto a substrate while applying the 1C SPU foam formulation in a manner that does not require either prompt and thorough cleaning of the applicator or disposal of the applicator. The present invention is particularly useful for applying a layer of 1C SPU foam formulation onto a substrate to serve as an adhesive layer for a flexible roofing membrane.

The present invention is a result of discovering that using a supplemental propellant to spray a 1C SPU foam formulation allows dispersion of the 1C SPU foam formulation as fine enough formulation particles so as to form a thin (less than 400 grams per square meter ($g/m^2$)) layer of 1C SPU and at a fast enough rate so that the thin layer of adhesive can be applied to the substrate and a roofing membrane can be applied over the adhesive layer prior to curing of the adhesive layer.

Use of a supplemental propellant to dispense a 1C SPU foam formulation is unique. 1C SPU foam formulations contain a blowing agent that typically serves as a propellant to expel the 1C SPU foam formulation from a compressed container. However, a supplemental propellant is needed to both disperse a 1C SPU foam formulation into a thin enough layer to achieve the thin coverage of the present invention as well as to apply the coating quickly enough to cover a large area and lay down a flexible roofing membrane over that area before the thin adhesive cures.

The present invention is further a result of identifying an applicator (dispensing accessory) for use in dispensing the 1C SPU foam formulation in a manner that does not require complete cleaning or disposal of the entire applicator between uses. The applicator used in the present invention has a removable nozzle in which the 1C SPU foam formulation is combined with a supplemental propellant and from which the 1C SPU foam formulation is expelled from the applicator. The removable nozzle (tip) can be replaced or cleaned between uses without having to clean or dispose of the entire dispensing accessory.

The present invention further benefits from discovering the importance of a rapid application rate (flow rate) when applying a thin layer of 1C SPU foam formulation as an adhesive layer. Application rate is more important for a thin layer of 1C SPU foam formulation than with either a thicker layer of 1C SPU foam formulations or even 2C SPU foam formulation layers of any thickness. Moisture can more completely penetrate a thin layer of 1C SPU foam formulation layer and cause it to cure more completely than with a thick layer or a layer of 2C SPU foam formulation that is inert to moisture. An application rate of at least 40 grams per 15 seconds, preferably at 60 grams per 15 seconds, more preferably at least 80 grams per 15 seconds is necessary to dispense a thin layer of 1C SPU and allow enough time to cover the layer with a flexible roofing membrane.

Embodiments of the present invention resolve a problem associated with expelling 1C SPU foam formulation from a compressed supply vessel at desirable flow rates of at least 60 grams per 15 seconds at temperatures of 20 degrees Celsius. It was discovered that when the 1C SPU foam formulation contains 20 wt % or more of a fluorinated olefin (based on total weight of isocyanate, polyol and blowing agent) a particularly efficient system is obtained that allows expulsion of over 95 wt % of the 1C SPU foam formulation from a supply vessel at a flow rate of at least 60 grams per 15 seconds at 20° C.

In a first aspect, the present invention is a process comprising: (a) providing a one-component spray polyurethane foam formulation comprising a blowing agent and prepolymer reaction products resulting from reacting isocyanates and polyols in the presence of a catalyst, the prepolymer having free isocyanate groups at a concentration in a range of 12 to 17 weight-percent based on prepolymer weight and the blowing agent being selected from carbon dioxide, saturated fluorinated hydrocarbons and unsaturated fluorinated hydrocarbons and being present at a concentration of at least $9 \times 10^{-4}$ moles per kilogram of foam formulation; (b) providing a supplemental propellant; (c) providing a dispensing accessory comprising a removable nozzle that can reversibly disconnect from the rest of the dispensing accessory and that defines a flow channel defined through it, including an exit opening of the flow channel from the dispensing accessory; (d) feeding the one-component spray polyurethane foam formulation and supplemental propellant independent from one another into the dispensing accessory so that they combine in the removable nozzle; and (e) expelling the one component spray polyurethane foam formulation and supplemental propellant together from the dispensing accessory from the exit opening of the removable nozzle at a rate that is greater than 40 grams of foam formulation per 15 seconds.

The present invention is useful for applying 1C SPU foam formulation onto a substrate, particularly in roofing applications where a flexible roofing membrane is applied over the 1C SPU foam formulation and substrate.

BRIEF DESCRIPTION OF THE DRAWINGS

FIG. 1 is a plot of the flow rate of one component spray polyurethane formulations from the Examples as a function of remaining formulation volume in the supply tank.

DETAILED DESCRIPTION OF THE INVENTION

"And/or" means "and, or as an alternative". "Multiple" means "two or more". All ranges include endpoints unless otherwise indicated.

Applicants anticipate that aspects of any embodiment are combinable in an unlimited fashion with any aspects of any other embodiments unless such a combination is physically impossible.

The process of the present invention requires a one-component (1C) spray polyurethane (SPU) foam formulation. The 1C SPU foam formulation comprises an prepolymer reaction products ("prepolymer") resulting from reacting isocyanates and polyols in the presence of a catalyst. Notably, use of the plural term "isocyanates" merely means there is more than one isocyanate molecule present and is not meant to imply that there need be more than one type of isocyanate molecule present. The isocyanates can comprise a blend of more than one type of isocyanate molecule or may consist of a single type of isocyanate molecule. Likewise, use of the term "polyols" means there is more than one polyol molecule present and is not meant to imply that there need be more than one type of polyol molecule present. The polyols can comprise a blend of different polyol molecules or consist of a single type of polyol molecule.

The ratio of isocyanates and polyols is such that the resulting prepolymer reaction products have free isocyanate groups at a concentration of 12 weight-percent (wt %) or more, preferably 13 wt % or more and at the same time 17 wt % or less, preferably 15 wt % or less based on prepolymer weight. Determine the amount of free isocyanate groups as a weight percent based on prepolymer weight (% FI) by using the following stoichiometric calculation based on the functionality of the isocyanate and functionality of the polyol combined to prepare the prepolymer:

$$\%FI = 100 \times Mw_{(NCO)} \times (Eq_{ISO} - Eq_{poly})/(W_{ISO} + W_{poly})$$

where $Eq_{ISO}$ is the equivalent weight of isocyanate added to make the prepolymer, $Eq_{poly}$ is the equivalent weight of polyol added to make the prepolymer, $Mw_{(NCO)}$ is the molecular weight of isocyanate (NCO) groups (42 grams per mole), $W_{ISO}$ is the weight of isocyanate and $W_{poly}$ is the weight of polyol.

Suitable isocyanates for preparing the prepolymer include polyisocyanates, preferably organic polyisocyanates. Suitable organic polyisocyanates include aliphatic, cycloaliphatic, aryliphatic and preferably aromatic polyisocyanates. Examples of suitable isocyanates include alkylene diisocyanates having from 4 to 12 carbon atoms in the alkylene moiety such as 1,12 dodecane diisocyanate; 2-methylpentamethylene 1,5-diisocyanate; tetramethylene 1,4-diisocyanate; hexamethylene 1,6-diisocyanate; cyclohexane 1,3- and 1,4-diisocyanate; 1-isocyanato-3,3,5-trimethyl-5-isocyanatomethylcyclohexane (isophorone diisocyanate), 2,4- and 2,6-hexahydrotoluene diisocyanate and the corresponding isomer mixtures; 4,4'-, 2,2'- and 2,4' dicyclohexylmethane diisocyanate and the corresponding isomer mixtures; 2,4- and 2,6-toluene diisocyanate and the corresponding isomer mixtures; 4,4'-, 2,4'- and 2,2'-diphenylmethane diisocyantes; polymethylene polyphenyl isocyanates; mixtures of 4,4',2, 4'- and 2,2' diphenylmethane diisocyanates and polymethylene polyphenyl isocyanates (PMDI); and mixture of PMDI and toluene diisocyanates.

The isocyanate is present in a comparative ratio to the polyols in a ratio range of 7:1 to 14:1, preferably 9:1 to 14:1 isocyanate functionality (NCO) equivalents to hydroxyl (OH) equivalents.

The polyols are selected from polyether and/or polyester polyols. All of the polyol molecules can be the same or they can be a blend of more than one type of polyol. The polyols may contain amine groups. The number average molecular weight of the polyols is desirably between 500 and 12,000 grams per mole. The polyols desirably have a functionality of 2 or more and at the same 4 or less, preferably 3 or less.

Polyols can be produced by techniques known in the art. For example, suitable polyester polyols are produced from polycarboxylic acids and polyfunctional alcohols having from 2 to 12 carbon atoms. Examples of suitable polycarboxylic acids include glutaric acid, succinic acid, adipic acid, sebacic acid, phthalic acid, siophthalic acid and terephthalic acid. Examples of suitable polyfunctional alcohols include ethylene glycol, propylene glycol, propanediol, butane and hexane diol, and mixtures of polyfunctional alcohols.

Polyether polyols can be obtained in conventional manners by reacting alkylene oxides (such as ethylene, propylene or butylenes oxide) with an initiator having two active hydrogen atoms for a diol and with an initiatory having three active hydrogen atoms for a triol. Examples of suitable initiators include ethylene glycol; diethylene glycol; propylene glycol; dipropylene glycol; tripropylene glycol; 1,4-butanediol; 1,6-hexane diol; cycloaliphatic diols such as 1,4-cycloheane diol, glycerine, timethanoyl propane and triethanolamine. Catalysts for the polymerization can be either anionic or cationic with catalysts such as potassium hydroxide (KOH), boron trifluoride, or a double cyanide complex catalysts such as zinc hexacyanocobaltate. Preferably, the polyols are obtained using propylene oxide for a combination of propylene and ethylene oxide.

Preferably, the polyols are a blend of a first and second polyether polyol. In one embodiment, the first polyether polyol is one or more triol and the second polyether polyol is one or more diol so that, when combined, the polyols preferably have a secondary hydroxyl functionality of at least about 50 percent. That is, at least 50 percent of the hydroxyl functionalities in the polyols are secondary hydroxyls (attached to secondary carbons). The triols preferably have a molecular weight of 500 grams per mole (g/mol) or more, more preferably 800 g/mol or more, and at the same time preferably 3000 g/mol or less, more preferably 2500 g/mol or less. The diols preferably have a molecular weight of 4000 g/mol or more, more preferably 5000 g/mol or more, still more preferably 6000 g/mol or more and yet more preferably 8000 g/mol or more while at the same time is desirably 12,000 g/mol or less and more preferably 10,000 g/mol or less.

In another preferred embodiment the second polyol is one or more triol having a secondary hydroxyl functionality of at least about 50 percent and a molecular weight in g/mol of 4,000 or more, preferably 5,000 or more, more preferably 6,000 or more and most preferably 9,000 or more and at the same time 12,000 or less, preferably 10,000 or less.

The catalyst present when reacting the isocyanates and polyols to form the prepolymer is desirably an amine catalyst. Suitable amine catalysts include primary, secondary and/or tertiary amines with tertiary amines preferred. Examples of suitable catalysts include dimorpholine compounds such as dimorpholinepolyether glycol and 2,2'-dimorpholinediethylether. Other suitable catalysts include organometallic compounds such as tin mercaptide and dibutyltin dilaurate.

The isocyanates, polyols and catalyst are mixed together in a vessel to react and form the prepolymer reaction products. Generally, a premix is formed with the polyols and any additives (see below) and that premix is added to the isocyanates and then blowing agent is added to form the 1C SPU foam formulation. Blowing agent can be added to the prepolymer reaction products in the same vessel in which the prepolymer is made or in a different vessel.

The blowing agent is one or any combination of more than one material selected from carbon dioxide, saturated fluorinated hydrocarbons and unsaturated fluorinated hydrocarbons. The blowing agent can comprise only fluorinated hydrocarbons either as saturated fluorinated hydrocarbons, unsaturated fluorinated hydrocarbons or as a combination of saturated fluorinated hydrocarbons and unsaturated fluorinated hydrocarbons. Particularly desirably unsaturated fluorinated hydrocarbons are fluorinated olefins. It is especially desirable to select blowing agents from carbon dioxide; 1,1,1,2-tetrafluoroethane (HFC-134a) and trans-1,3,3,3-tetrafluoroprop-1-ene (HFO-1234ze). The blowing agent can be free of carbon dioxide.

In developing the present invention, it has been discovered that selection of blowing agent can impact optimal performance of the 1C SPU in the process of the present invention. 1C SPU foam formulation typically comes in pressurized containers or vessels. It is desirable to be able to efficiently use as much of the 1C SPU foam formulation in a container as possible.

The process of the present invention includes expelling 1C SPU foam formulation from an applicator accessory at a rate of at least 40 grams, preferably 50 grams or more, more preferably 60 grams or more, still more preferably 70 grams or more per 15 seconds. Therefore, it is desirable to select a blowing agent that is capable of achieving that flow rate over as much volume of the a 1C SPU foam formulation supply container as possible. Temperature as well as selection of blowing agent affects application rate. It is desirably to achieve these rates in a temperature range of 10-25 degrees Celsius over 90% or more of the volume of 1C SPU in the supply container. To accomplish this it is desirable to include as a blowing agent at least 13 wt % fluorinated olefin, preferably 15 wt % fluorinated olefin or more, still more preferably 20 wt % or more fluorinated olefin with wt % relative to total weight of polyols, isocyanates and blowing agents.

The total amount of blowing agent is desirably present at concentration of at least $9 \times 10^{-4}$, preferably $1 \times 10^{-3}$ or more, still more preferably $1.5 \times 10^{-3}$ or more moles per kilogram of 1C SPU foam formulation.

The 1C SPU foam formulation can contain one or any combination or more than one additive. Suitable additives include flame retardants (such as chlorinate or brominates phosphate, phosphonates, inorganic oxides and chlorides), pigments and/or colorants, silyl-terminated substances, crosslinking agents or chain extenders (such as ethylene glycol, diethylene glycol, 1,4-butanediol, glycerine, diethanolamine, triethanolamine, ethylene diamines, xylenediamine, and methylene-bis(o-chloroaniline)) and surfactants.

The process of the present invention also requires providing a supplemental propellant. The supplemental propellant is initially provided independent from the 1C SPU foam formulation and then fed separately into a dispensing accessory where they contact one another in a removable nozzle. "Independent from" means that the supplemental propellant and 1C SPU foam formulation are not in contact with one another.

The supplemental propellant is a pressurized gas, meaning it is a gas that is under a higher pressure than the atmosphere into which the 1C SPU foam formulation is going to be expelled in the process of the present invention. The supplemental propellant preferably remains a gas under pressures at which it is provided to the dispensing accessory and mixed with the 1C SPU foam formulation. Generally, the supplemental propellant can be any gas that remains in a non-condensed phase at pressures of one Mega Pascal (MPa) or lower. The supplemental propellant is desirably selected from air, nitrogen, carbon dioxide and nitrous oxide.

It is common to provide the supplemental propellant to the dispensing accessory at a pressure of 400 kiloPascals (kPa) or more, preferably 500 kPa or more and can be at a pressure of 600 kPa or more, 700 kPa or more, 800 kPa or more and even 900 kPa or more. At the same time, the supplemental propellant is typically supplied at a pressure of one MPa or less, preferably 700 kPa or less and most preferably 600 kPa or less. A pressure above 400 kPa is desirable in order to ensure fine enough dispersion of the 1C SPU foam formulation so as to achieve a thin coating of the 1C SPU foam formulation on a substrate to which it is applied. The supplemental propellant serves to break up the 1C SPU foam formulation as it is sprayed from the dispensing accessory. If the pressure of the supplemental propellant is below 400 kPa the 1C SPU foam formulation tends to dispense in clumps larger than is desirable for achieving a thin coating (less than 400 grams per square meter). Higher pressures of supplemental propellant tend to create finer particles of the 1C SPU foam formulation as it sprays out from the dispensing accessory and facilitates applying a thinner coating and faster coverage of a surface. Technically, there is no known upper limit for the pressure of the supplemental propellant but practically pressures greater than one MPa become challenging because high pressure equipment tends to become necessary for safety reasons.

The present invention further requires providing a dispensing accessory. The dispensing accessory comprises a removable nozzle that can reversibly disconnect from the rest of the dispensing accessory. The removable nozzle is desirably made primarily of plastic and can be made entirely of plastic. "Made primarily of plastic" means more than 50 percent by weight is plastic. In fact, the entire dispensing accessory is desirably made primarily of plastic and can be 80 wt % or more and even 100 wt % plastic by weight of the dispensing accessory. Plastic removable nozzles cost less than other materials such as metal and therefore are ideal for being disposable. By being reversibly removable from the dispensing accessory, the removable nozzle is readily replaceable or capable of being removed, cleaned and reinstalled.

The removable nozzle defines a flow channel that extends through the removable nozzle. The removable nozzle defines as part of the flow channel an exit opening for the dispensing accessory. When dispensing 1C SPU foam formulation using the dispensing accessory 1C SPU foam formulation and supplemental propellant contact one another in and flow through the flow channel of the removable nozzle prior to being expelled from the dispensing accessory through the exit opening. The removable nozzle can include a mixing element (such as a static mixing device) defined within the flow channel to mix supplemental propellant and 1C SPU foam formulation with one another just prior to expelling from the dispensing accessory.

The dispensing accessory desirably has a trigger mechanism. The trigger mechanism reversibly blocks (when trigger is closed) or opens (when trigger is activated) access to the flow channel in the removable nozzle. When containers of 1C SPU foam formulation and supplemental propellant are connected to the flow channel of the removable nozzle, activation of the trigger mechanism initiates flow of the 1C SPU and supplemental propellant through the flow channel and out the exit opening of the removable nozzle in order to expel the 1C SPU from the dispensing accessory.

The dispensing accessory desirably has a back-flow prevention design that prevents flow of 1C SPU foam formulation into the line providing the supplemental propellant. 1C SPU foam formulation is fed into the dispensing accessory separate from the supplemental propellant and the two are mixed together in a flow channel of the dispensing accessory. The back-flow prevention design prevents 1C SPU foam formulation from entering the supplemental propellant feed prior to the point where the supplemental propellant and 1C SPU foam formulation are combined in the dispensing accessory. The back-flow prevention design can be a one-way flow valve in the supplemental propellant feed line that only allows flow of the propellant into the flow channel of the dispensing accessory but not flow back from the flow channel to the feed line.

Examples of suitable dispensing accessory designs include those of U.S. Pat. No. 5,529,245. One particularly desirable dispensing accessory is the INSTA-FLO™ gun available from The Dow Chemical Company. The INSTA-FLO gun is a dispensing accessory that has an anti-crossover nozzle with two main pieces that snap together: (1) a rear portion that includes two separate inlets and a trigger opening mechanism; and (2) a disposable nozzle. The INSTA-FLO gun is described, for example, in U.S. Pat. No. 6,021,961. For use in the present invention a 1C SPU foam formulation supply is attached to one of the inlets and the other inlet is connected to a supplemental supply source.

The removable nozzle on the applicator accessory serves an important purpose in the practice of the present invention. 1C SPU foam formulation sets or cures upon exposure to moisture from the air. Hence, after expelling 1C SPU foam formulation from the application accessory there is a risk that moisture will begin curing 1C SPU foam formulation that remains in the application accessory due to exposure to air through the exit opening. 1C SPU foam formulation that is still in the application accessory can begin setting or curing within the accessory, but only within the removable nozzle where the exit opening is. Once set, the 1C SPU foam will inhibit further penetration of moisture into the applicator accessory. Hence, setting will be limited to the removable nozzle. Subsequent uses of the application accessory to apply 1C SPU can be accomplished simply by replacing the removable nozzle or by removing and cleaning only the removable nozzle, thereby eliminating need to clean the entire applicator accessory or discard the entire applicator accessory.

The process of the present invention is particularly useful for applying 1C SPU foam formulation as an adhesive on a roof substrate and then applying a flexible roofing membrane over the adhesive and substrate. The present process of applying 1C SPU foam formulation allows application to a substrate surface of a thin coating (less than 400 grams of 1C SPU foam formulation per square meter of substrate surface), preferably a coating that is 300 grams, and can be 200 grams or less, even 100 grams or less of 1C SPU foam formulation per square meter of substrate surface.

The process further enables the 1C SPU foam formulation to be applied as a coating over an entire substrate surface where a flexible membrane will cover and then application of a flexible membrane applied over the adhesive all prior to the adhesive setting. This is in contrast to applying beads of 1C SPU foam formulation as adhesive beads, which results in ridges in the roofing membrane surface where the beads are located and can result in bubbles and blisters in the membrane between adhesive beads. Desirably, the process of the present invention includes application of a uniform coating of 1C SPU foam formulation over a substrate. Use of the supplemental propellant not only facilitates application of a thin coating of 1C SPU foam formulation but fast application over a large surface area of a substrate, which is beneficial for coating a substrate quickly enough to enable application of a flexible roofing membrane over the substrate before the 1C SPU foam formulation sets or cures.

The following examples illustrate embodiments of the present invention.

EXAMPLES

For each of the following examples, prepare a 1C SPU foam formulation using polymeric diphenylmethane 4,4' diisocyanate (VORANATE™ M229, VORANATE is a trademark of The Dow Chemical Company) as the isocyanate and a polyol composition as described in Table 1 that includes catalyst.

TABLE 1

| Component | Concentration for Given 1C SPU Foam Formulation (wt % based on total polyol composition weight) | |
|---|---|---|
| | Fl, F3 and F4 | F5 |
| 1000 g/mol Mw polyether diol (VORANOL™ P1010L) | 75.2 | 78.2 |
| Trichloropropylphosphate | 19.5 | 20 |
| Organo silicone emulsifier (NIAX™ FP01) | 2 | 0 |
| Bis(2,2-morpholinoethyl) ether amine catalyst | 1.29 | 1.294 |
| Dimethyltin mercaptide (FOMREZ™ UL22) | 0.006 | 0.006 |
| Polydimethyl siloxane cell opener (BAYSILONE™ M100) | 0.004 | 0 |
| Silicone glycol copolymer surfactant (DABCO DC198) | 2 | 2 |

VORANOL is a trademark of The Dow Chemical Company.
NIAX is a trademark of General Electric Company.
FOMREZ is a trademark of Chemtura Corporation.
BAYSILONE is a trademark of Bayer Aktiengesellschaft.
DABCO is a trademark of Air Products.

Add the isocyanate and polyol composition together and allow to react to form a prepolymer. Add to the prepolymer a blowing agent composition selected from HFO-1234ze and carbon dioxide. The components used to prepare the 1C SPU foam formulations are in Table 2.

TABLE 2

| 1C SPU Foam Formulation | Isocyanate (g) | Polyol Composition (g) | HFO-1234ze (g) | HFO-1234ze (mol/kg) | CO2 (g) | CO2 (mol/kg) |
|---|---|---|---|---|---|---|
| F1 (9 wt % HFO)[a] | 4710 | 3960 | 915 | $9.26 \times 10^{-4}$ | 230 | $6.03 \times 10^{-4}$ |
| F3 (13 wt % HFO)[a] | 4710 | 3960 | 1325 | $1.34 \times 10^{-3}$ | 225 | $5.90 \times 10^{-4}$ |
| F4 (15 wt % HFO)[a] | 4710 | 3960 | 1530 | $1.55 \times 10^{-3}$ | 225 | $5.90 \times 10^{-4}$ |
| F5 (20 wt % HFO)[a] | 4510 | 3790 | 2140 | $2.26 \times 10^{-3}$ | 0 | 0 |

[a] wt % is based on total weight of isocyanate, polyol and blowing agent.

1C SPU Foam Formulation Spray Rate Based on Blowing Agent

Provide an application accessory with a removable nozzle (INSTA FLOW gun from The Dow Chemical Company). The accessory is a plastic assembly with two independent feed inlets that combine in a flow channel of a plastic removable nozzle.

Provide a cylinder of 1C SPU foam formulation selected from Table 2 and attach the cylinder to one of the feed inlets of the application accessory. Without using a supplemental propellant, determine the flow rate of 1C SPU foam formulation from the cylinder as the cylinder empties. Typically, flow rate decreases as the 1C SPU foam formulation decreases in the supply cylinder. It is desirable for the cylinder to provide a flow rate of at least 40 grams per 15 seconds over as much of the tank volume as possible in order to allow efficient application of as much of the 1C SPU foam formulation as possible.

Determine tank volume in weight by subtracting the weight of the empty cylinder ($W_{empty}$) from the weight of the cylinder containing 1C SPU foam formulation ($W_{cylinder+SPU}$) and that provides the weight of 1C SPU foam formulation in the cylinder. The initial weight of the cylinder when full of 1C SPU ($W_{full}$) provides an initial volume of 1C SPU foam formulation in the cylinder. Therefore, at any point during dispensation of the 1C SPU from the cylinder the wt % of 1C SPU foam formulation remaining is determined by the following calculation:

Tank Volume (wt %)=100%×(($W_{cylinder+SPU}$−$W_{empty}$))/(($W_{full}$)−($W_{empty}$))

Determine flow rate at different tank volumes by weighing the cylinder to obtain an initial weight in grams ($W_i$), spraying the 1C SPU foam formulation for 15 seconds and then obtaining a final eight of the cylinder in grams ($W_f$). The flow (FR) is calculated in grams per 15 seconds (g/15 s) using the following equation:

$FR=(W_i-W_f)/15$ seconds

Table 3 provides flow rate for the different 1C SPU foam formulations at different temperatures and FIG. 1 illustrates a plot of the data from Table 2 for convenient analysis.

TABLE 3

| Formulation | | | | | | | |
|---|---|---|---|---|---|---|---|
| F1 | | F3 | | F4 | | F5 | |
| Temperature (° C.) | | | | | | | |
| 25 | | 25 | | 23 | | 20 | |
| Performance | | | | | | | |
| Tank Volume (wt %) | Flow Rate (g/15 s) | Tank Volume (wt %) | Flow Rate (g/15 s) | Tank Volume (wt %) | Flow Rate (g/15 s) | Tank Volume (wt %) | Flow Rate (g/15 s) |
| 100 | 150 | 97 | 173 | 89 | 190 | 98 | 146 |
| 90 | 150 | 70 | 139 | 67 | 145 | 73 | 156 |
| 70 | 118 | 46 | 100 | 49 | 107 | 50 | 123 |
| 33 | 58 | 28 | 79 | 22 | 71 | 24 | 96 |
| 17 | 50 | 13 | 50 | 5 | 25 | 10 | 74 |

The data reveals that even at lower temperatures, the 1C SPU foam formulations containing more fluorinated olefin blowing agent expel more of the 1C SPU from the storage vessel at higher flow rate than formulations containing lower fluorinated olefin blowing agent. In fact, it becomes apparent that particularly efficient expulsion of 1C SPU foam formulation occurs when the concentration of fluorinated olefin blowing agent is 20 wt % or more under which condition a flow rate of 74 grams per 15 minutes is still achieved when only 10 percent of the SPU foam formulation remains in the supply cylinder, even at a 20° C. application temperature. Notably, the data for the other formulation are at higher temperatures, which results in a higher flow rate at a given volume remaining in the supply cylinder. It is clear that to achieve 60 grams per 15 seconds flow rate at 20° C. when 10 percent or less of the SPU foam formulation remains in the supply cylinder the formulation benefits from having at least 20 wt % fluorinated olefinic blowing agent relative to total weight of isocyanate, polyol and blowing agent.

Use of Supplemental Propellant

Provide compressed air at a pressure of 700 kPa to serve as a supplemental propellant. Using an INSTA FLO gun dispensing accessory, connect the compressed air to one of the inlet feeds and a cylinder of F5 1C SPU foam formulation to the other inlet feed.

Spray the 1C SPU foam formulation onto a 300 millimeter by 300 millimeter sheet of extruded polystyrene foam board (STYROFOAM™ IB-A, STYROFOAM is a trademark of The Dow Chemical Company) as a uniform coating having a density (coating thickness) of approximately 40 grams per square meter of foam surface.

The adhesive strength of the formulation is tested by subsequently applying a second piece of the same type of extruded polystyrene foam board over the coating and allowing the coating to cure under a load of 25 kilograms. Test samples were cut to obtain 50 millimeter by 50 millimeter cubes and tested for tensile strength according to the procedure of EN 1607. The resulting tensile bond strength is 210 kPa.

Application of 1C SPU foam formulation onto a roof substrate in like manner followed by application of a flexible roofing membrane over the 1C SPU foam formulation will provide a flexible roofing membrane uniformly adhered to the substrate and free from patterns extending through the flexible roofing membrane as a result of non-uniform application of 1C SPU foam formulation. Likewise, the uniform coating of 1C SPU foam formulation will prevent bubbling or blistering of the flexible roofing membrane due to large gaps between beads of adhesive common in current application methods.

Similar results are expected for 1C SPU foam formulations F1, F3 and F4.

Example Illustrating Value of Removable Nozzle

When using the INSTA FLO gun dispensing accessory to spray the 1C SPU foam formulation with a supplemental blowing agent as just described, the 1C SPU foam formulation and supplemental blowing agent combine in a removable nozzle from which they are expelled from the dispensing accessory. When application of the 1C SPU foam formulation is completed, moisture may penetrate through the exit opening of the removable nozzle and inducing curing of the 1C SPU foam formulation in the removable nozzle over time. To continue using the dispensing accessory to apply 1C SPU foam formulation even after curing in the removable nozzle, simply remove and either clean or replace the removable nozzle and continue spraying the 1C SPU foam formulation. Unlike other systems, the dispensing accessory itself does not require cleaning in order to continue use after a period of time.

As a comparative example, use a metal Puma™ AS-1040 high pressure spray gun (Puma is a trademark of Puma Industrial Company) to spray the 1C SPU foam formulations by providing 1C SPU foam formulation in the cup of the spray gun and connecting compressed air to the air feed of the gun. After spraying 1C SPU foam formulation for a period of time, allow the spray gun to set for 12 hours. The 1C SPU foam formulation in the exit opening of the gun will typically cure and plug the flow channel of the gun (actual time to plug depends on humidity in surrounding air with higher humidity inducing faster curing). There is no way to continue using the gun without disassembling and cleaning the gun, or by replacing the gun with an entirely new gun.

The invention claimed is:

1. A process comprising:
   a. providing a one-component spray polyurethane foam formulation comprising a blowing agent and prepolymer reaction products resulting from reacting isocyanates and polyols in the presence of a catalyst, the prepolymer having free isocyanate groups at a concentration in a range of 12 to 17 weight-percent based on prepolymer weight and the blowing agent being one or more selected from the group consisting of carbon dioxide, saturated fluorinated hydrocarbons and unsaturated fluorinated hydrocarbons and being present at a concentration of at least $9 \times 10^{-4}$ moles per kilogram of foam formulation;
   b. providing a supplemental propellant consisting of a pressurized gas at a pressure of 400 kiloPascals or more and at the same time one MegaPascal or less;
   c. providing a dispensing accessory comprising a removable nozzle that can reversibly disconnect from the rest of the dispensing accessory and that defines a flow channel defined through it, including an exit opening of the flow channel from the dispensing accessory;
   d. feeding the one-component spray polyurethane foam formulation and supplemental propellant independent from one another into the dispensing accessory so that they combine in the removable nozzle; and
   e. expelling only the one component spray polyurethane foam formulation and supplemental propellant together from the dispensing accessory from the exit opening of the removable nozzle at a rate that is greater than 40 grams of foam formulation per 15 seconds.

2. The process of claim 1, further comprising disposing the one-component spray polyurethane foam formulation onto a substrate as a layer upon expelling from the dispensing accessory so that the layer comprises less than 400 grams of one-component spray polyurethane foam formulation per square meter of substrate surface.

3. The process of claim 1, wherein the blowing agent is a combination of carbon dioxide and one or more blowing agent selected from fluorinated olefins and saturated fluorinated hydrocarbons.

4. The process of claim 1, further comprising expelling the one-component spray polyurethane foam formulation from the dispensing accessory in step (c) as a coating onto a substrate and then applying a flexible roofing membrane over the substrate so that the spray polyurethane foam formulation contacts both the flexible roofing membrane and the substrate.

5. The process of claim 1, further characterized by expelling the one-component spray polyurethane foam formulation onto a substrate as a uniform coating on the substrate.

6. The process of claim 1, wherein the nozzle that is removable from the rest of the dispensing accessory is plastic.

7. The process of any of claim 1, wherein the dispensing accessory is more than 50 weight-percent plastic based on total dispensing accessory weight.

* * * * *